2,768,989

WEAKLY BASIC SULFUR CONTAINING ANION EXCHANGERS

Geert J. De Jong and Johannes A. Zeegers, Geleen, Netherlands, assignors to Stamicarbon N. V., Heerlen, Netherlands No Drawing. Application May 28, 1953, Serial No. 358,176

Claims priority, application Netherlands June 5, 1952

11 Claims. (Cl. 260—2.1)

Our invention relates to new compositions of matter which have been found to have exceptional properties as weakly basic anion exchangers and to have advantages in this connection over compounds known hitherto.

The said new compositions of matter consist of or contain macromolecular organic compounds holding weakly basic sulfur-containing groups, which are the carriers of the said anion exchanging properties.

Our invention also relates to processes for the preparation of the said new compositions of matter as well as to methods of exchanging anions in solutions in which use is made of said compositions as anion exchangers.

The new compositions of matter concerned will be described herein in connection with their anion exchanging properties, but it is believed that they are new per se and may have many other useful properties.

It is the main object of our invention to provide new weakly basic anion exchangers with a high capacity, especially for removing strongly acid anions from solutions, e. g. demineralizing sugar juices.

It is a further object of our invention to provide weakly basic anion exchangers which have a great resistance to the action of an alkaline lye and to prolonged heating.

It is still a further object of our invention to provide weakly basic anion exchangers which may be used in other media as water, e. g. alcohols, esters, ethers or halogen alkanes, for binding organic anions dissolved therein.

It is also an object of our invention to provide processes for the preparation of the said compositions of matter in which the persistence, or the formation, of strongly basic sulfonium groups is substantially impossible.

A further object of our invention is the preparation of the said new compositions of matter in a special form, especially suited for their use as anion exchangers, or as selective membranes for electrolysis or electrodialysis.

The following description contains a limited number of embodiments of our invention. It is to be understood that our invention is not limited thereto since numerous variations are possible without departing from the scope of the claims hereof.

In co-pending G. J. De Jong application No. 300,115 the preparation and use of strongly basic anion exchangers is described and claimed, the ion exchanging properties of which are due to the presence of sulfonium groups. These macromolecular sulfonium compounds may be obtained either by introducing sulfonium groups into a macromolecular organic compound or forming them therein, or by polymerising or polycondensing sulfonium compounds of low molecular weight into products of high molecular weight.

More particularly attention was drawn to products in which the sulfur atom of the sulfonium groups carries at least one alkoxyaryl group.

Besides having a large capacity the resulting compounds appeared to have an unexpectedly great resistance to e. g., alkali. For obtaining a high capacity it was found to be of importance to carry out the preparation of the strongly basic anion exchanger at low temperature as otherwise undesirable side-reactions would occur.

It was found, most unexpectedly that these strongly basic anion exchangers containing on the sulfur of the sulfonium groups at least one alkoxyaryl group, when heated in the basic form in alkaline solution at temperatures between 75 and 150° C. are converted into a modified form having weakly basic properties. The conversion is preferably carried out between 100 and 140° C. because at 90° C. the conversion takes a long time to complete whereas at 140° C. it is mostly completed within 1 hour while dissociation occurs above 150° C. The total capacity of the exchanger in the weakly basic form was found to be no less than in the strongly basic form and the resulting products are very stable. Thus, no decrease in capacity was found when the new exchanger was heated at 140° C. for over 150 hours in a 4% NaOH solution, nor was there a decrease in capacity after long immersion in a solution of molasses at 90° C.

Analogous products may be obtained by polycondensing the weakly basic products of low molecular weight prepared by the process claimed in our co-pending application Serial No. 358,175, filed May 28, 1953, either by heating a triaryl sulfonium hydroxide of which at least one of the aryl groups carries an alkoxy group, in an alkaline solution, or by reacting sulfur dioxide, a thionyl halogenide, a halogenide of an aryl sulfinic acid or a diaryl sulfoxide with an alkoxy aryl compound at a temperature higher than that at which the strongly basic tertiary sulfonium compounds are mainly formed, or by reacting a diaryl sulfoxide with a hydroxy aryl compound in the presence of a substance promoting cationoid substitution, such as, e. g., concentrated sulfuric acid.

These weakly basic products may be converted into macromolecular products by polymerisation, e. g. when alkenic groups occur therein, or by polycondensation, e. g. with formaldehyde or with a substance yielding formaldehyde.

For example, the weakly basic product obtained by treating trianisyl sulfonium hydroxide with 4% NaOH, may be condensed at 120° C. for 10 hours with paraformaldehyde in concentrated sulfuric acid.

On further examination of the strongly basic anion exchangers which had at least one alkoxy aryl group bound to the sulfur atom of the sulfonium groups it was found that in these strongly basic bodies also weakly basic groups were to be found if the temperature had not been kept sufficiently low during the preparation. However, these weakly basic groups do not interfere with the activity of the strongly basic groups.

If the preparation of the new weakly basic products is started from a strongly basic macromolecular sulfonium compound which is already in the granular state, this state is preserved during the treatment with lye, the only noticeable phenomenon being a considerable shrinking and further, if the strongly basic sulfonium compound is in the form of a plate or foil, the conversion into the new weakly basic form may be effected without difficulty.

Products obtained by polycondensation of the weakly basic monomers may be broken up into grains or scales. The polycondensation may also be carried out after the reaction mixture has been dispersed in a medium inert to this reaction to obtain the desired grain size. Finally it is possible to pour or press the reaction mixture to form plates or films or to shape it into other products in other manners suitable for artificial substances, before the reaction is completed.

The resulting products are very well suited for removing strongly acid anions from solutions. In particular their employment in the demineralisation of sugar juices should be mentioned. In contradistinction to the weakly basic anion exchangers usually used for this purpose no decomposition products are formed, not even when the exchangers are used for a long time.

Firms or membranes formed from the new products may advantageously be used in electrolysis or electrodialysis.

Our invention will be further explained with the help of the following examples:

Example 1

25 parts by volume of a strongly basic ion exchanger prepared in accordance with co-pending G. J. De Jong application No. 300,115 from 10 parts by weight of trianisyl sulfonium chloride and 1 part by weight of paraformaldehyde with the help of concentrated sulfuric acid at a temperature below 80° C., are brought into the basic state by treatment with soda lye and are subsequently heated with 25 parts by volume of a 4% caustic soda solution at 120° C. for 10 hours. During this treatment the resin shrinks to 13 parts by volume. The resulting weakly basic anion exchanger has a capacity of 1100 m. eq./litre. The resin which constituted the starting material had a capacity of 500 m. eq./litre in strongly basic groups. The resulting resin was found to consist of hard grains of rather low porosity. However, it appeared that the washability of the resin was amply sufficient.

Example 2

25 parts by volume of a strongly basic anion exchanger prepared according to Example 1 from 8 parts by weight of trianisyl sulfonium chloride and 1 part by weight of paraformaldehyde, but at a slightly higher temperature, on account of which the exchanger contains 350 m. eq./litre of strongly basic and 350 m. eq./litre of weakly basic groups, were heated with 25 parts by volume of 4% caustic soda at 125° C. during 10 hours. During this process the resin shrinks to 19.5 parts by volume. The capacity in weakly basic groups was found to be 770 m. eq./litre, whereas the presence of only very slight amounts of strongly basic groups was established.

The product consisted of hard grains having a great mechanical strength. In comparison with the product obtained according to Example 1 the diffusion velocity and washability of the new product proved to be considerably greater.

Example 3

100 parts by weight of dry powdery $AlCl_3$ was dissolved in 108 parts by weight of anisole, the temperature being raised to 75° C. Subsequently 44 parts by weight of thionyl chloride are added slowly and the temperature is maintained at 75° C. for 2 hours. The viscous mass is poured into 550 parts by weight of water, during which the $AlCl_3$ compound is decomposed and trianisyl sulfonium chloride is separated off. The resulting crude product is purified by extraction with hot water and subsequently dried. The yield is 80 to 90%.

100 parts by weight of this monomer were dissolved in 100 parts by weight of concentrated sulfuric acid and cooled to 0° C. Subsequently a solution of 10 parts by weight of paraformaldehyde in 50 parts by weight of concentrated sulfuric acid cooled to 0° C., was added while stirring strongly. By cooling the temperature was kept below 80° C. The resulting resinous gel was kept at room temperature during 24 hours, as a result of which a secondary hardening was obtained. Subsequently the resin was crushed, screened at the desired grain size (0.6 to 2 mm.) and washed with 1 N soda lye and water until the product was free of sulfate.

The anion exchanger obtained was found to have practically only weakly basic groups. The capacity amounted to 660 m. eq./litre. The mechanical strength was very good, as was the washability.

The swelling of the anion exchanger during the transition from the salt state into the basic state amounted to a maximum of 5%.

If the preparation of the monomer would have been carried out at 0° C. instead of at 75° C., a strongly basic anion exchanger would have been obtained.

Example 4

450 parts by weight of syrupy strongly basic triphenetyl sulfonium chloride prepared by reacting $SO_2$ and $AlCl_3$ upon phenetole at 0° C., were stirred with 500 parts by weight of a hot 4% solution of caustic soda. The sulfonium hydroxide formed does not dissolve therein. The aqueous liquid is decanted and the treatment repeated in an autoclave with 250 parts by weight of a 4% solution of caustic soda at 120° C. during 10 hours.

The resulting weakly basic syrupy product was neutralised with sulfuric acid and the salts obtained dried in vacuo.

The water-free salts were subsequently dissolved in concentrated sulfuric acid and condensed with paraformaldehyde in the manner described in Example 3.

The resulting product contained practically only weakly acid groups and had a capacity of 700 m. eq./litre. The product appeared very easy to wash and very proof against heating and lye.

Example 5

A mixture of 94 parts by weight of phenol and 258 parts by weight of di (m-xylyl) sulfoxide was added slowly while stirring to 940 parts by weight of cold concentrated sulfuric acid (S. G. 1.84), the temperature being kept below 20° C. The reaction was complete within 15 minutes.

The resulting solution was cooled to 0° C.; subsequently a solution of 47 parts by weight of paraformaldehyde in 188 parts by weight of concentrated sulfuric acid (S. G. 1.84), cooled to 0° C., was added under violent stirring. By cooling the temperature was kept below 80° C.

The resulting resin gel was broken up, screened and washed with lye. The product thus obtained held weakly basic sulfur-containing groups only. Its capacity amounted to 500 m. eq./litre.

We claim:

1. A process for preparing a weakly-basic anion-exchange resin containing sulphur from a strongly-basic anion-exchange resin prepared by condensing with formaldehyde in the presence of sulphuric acid, a tertiary sulphonium salt wherein the sulphur atom of said tertiary sulphonium salt is bonded to two alkoxy-aryl radicals and a radical selected from the group consisting of alkoxy-aryl, aryl, and alkaryl radicals and the anion of said sulphonium salt is the anion of a mineral acid, which comprises heating said strongly-basic resin with an alkaline lye at a temperature between 75° and 150° C.

2. The process of claim 1 wherein said heating is carried out at a temperature between 100° and 140° C.

3. The process of claim 1 wherein said tertiary sulphonium salt is bonded to three alkoxy-aryl radicals.

4. The process of claim 3 wherein said alkoxy-aryl radicals are alkoxy-phenyl radicals.

5. The process of claim 1 wherein said alkoxy-aryl radicals are methoxy-phenyl radicals.

6. The process of claim 1 wherein said alkoxy-aryl radicals are ethoxy-phenyl radicals.

7. The weakly-basic anion-exchange resin produced by the process of claim 1.

8. The weakly-basic anion-exchange resin produced by the process of claim 5.

9. The weakly-basic anion-exchange resin produced by the process of claim 6.

10. The weakly-basic anion-exchange resin produced by the process of claim 3.

11. The weakly-basic anion-exchange resin produced by the process of claim 4.

References Cited in the file of this patent

UNITED STATES PATENTS

| | | |
|---|---|---|
| 2,102,103 | Urbain et al. | Dec. 14, 1937 |
| 2,110,712 | Munz | Mar. 8, 1938 |
| 2,234,548 | Brannon | Mar. 11, 1941 |
| 2,347,182 | Coffman | Apr. 25, 1944 |
| 2,531,812 | Hauser | Nov. 28, 1950 |
| 2,597,494 | Hwa | May 20, 1952 |
| 2,631,993 | Morgan | Mar. 17, 1953 |
| 2,713,038 | De Jong | July 12, 1955 |

FOREIGN PATENTS

| | | |
|---|---|---|
| 316,370 | Great Britain | Aug. 1, 1929 |
| 152,172 | Austria | Jan. 10, 1938 |

OTHER REFERENCES

Schmidt: The Chemistry of the Amino Acids and the Proteins, pages 297–298, Baltimore, Md. (Copy in Div. 63.)